March 5, 1929.  R. E. MINOGUE  1,704,013
AGITATOR
Filed July 5, 1927   2 Sheets-Sheet 2
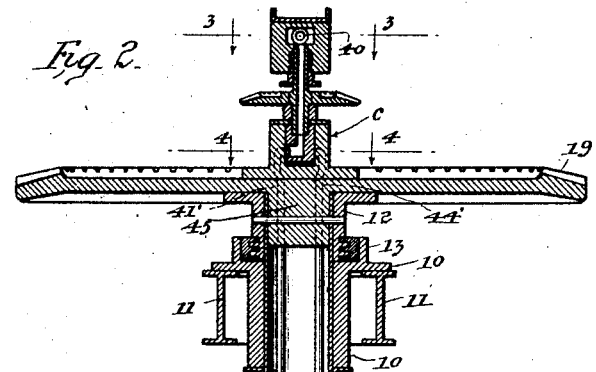
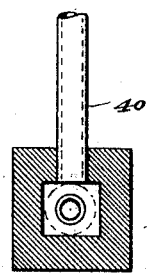
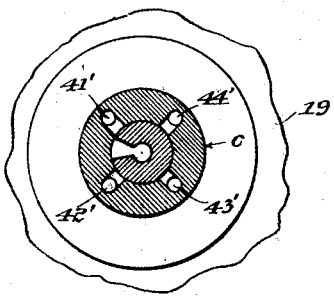
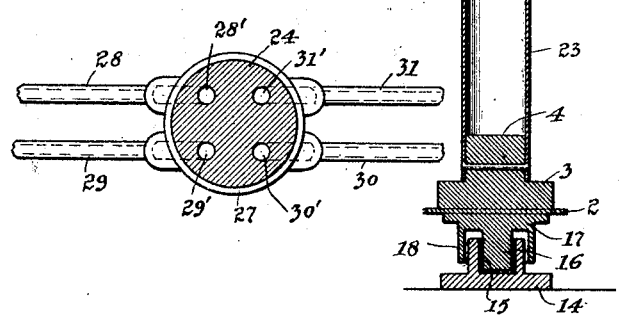
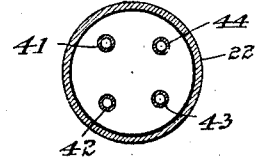
INVENTOR.
Roland E. Minogue,
BY
ATTORNEY.

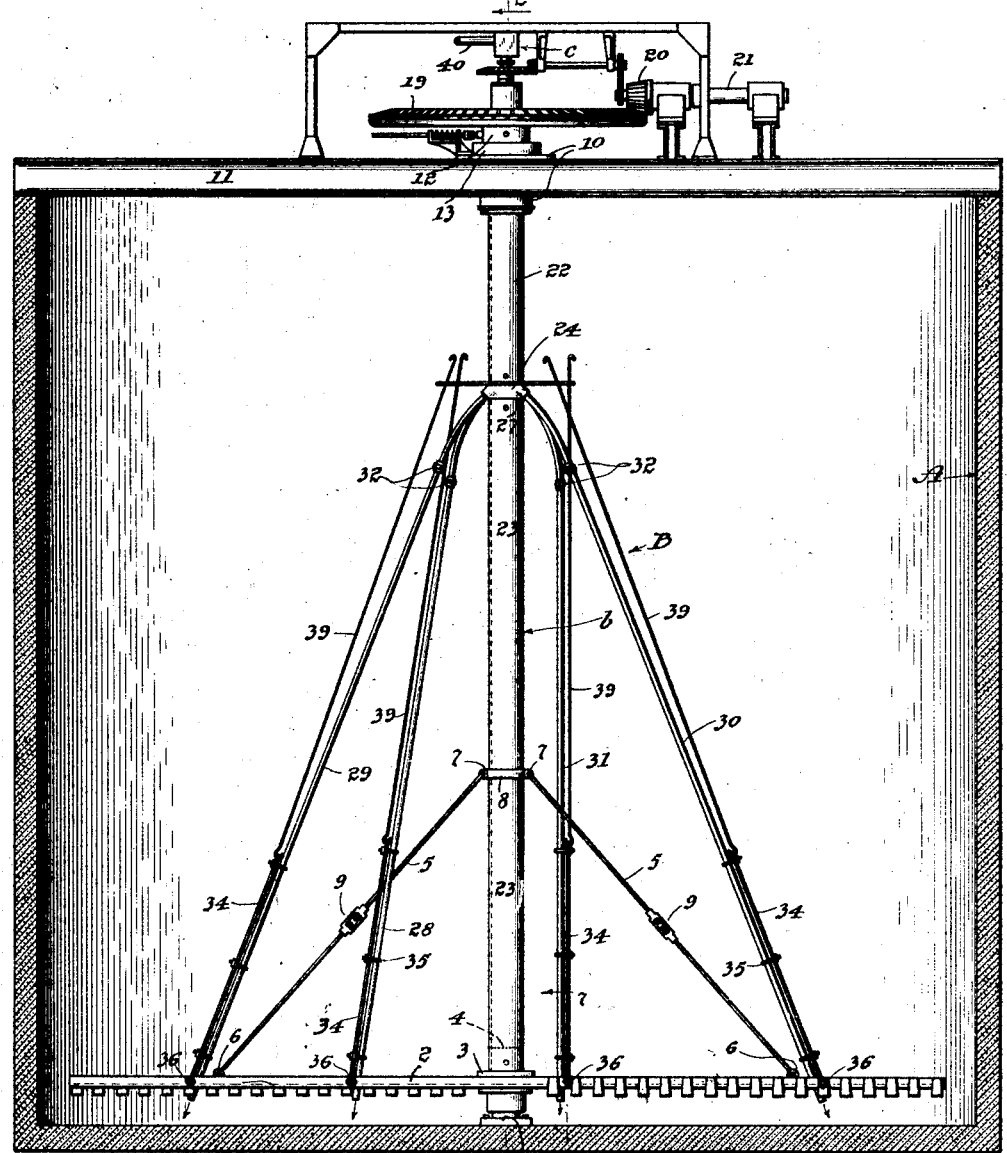

Patented Mar. 5, 1929.

1,704,013

UNITED STATES PATENT OFFICE.

ROLAND E. MINOGUE, OF MANITOWOC, WISCONSIN, ASSIGNOR OF ONE-THIRD TO HENRY VANDERWERP, OF MANITOWOC, WISCONSIN.

AGITATOR.

Application filed July 5, 1927. Serial No. 203,348.

This invention relates to agitators and relates particularly to agitators for mixing slurry in the manufacture of cement, and other liquid or semi-liquid products, in which agitation is effected in whole or in part by compressed air discharged into a tank containing a quantity of material to be agitated.

The agitator of the present application is of the general type shown and described in U. S. Letters Patent No. 1,633,708, dated June 28, 1927, issued jointly to myself and Henry Vanderwerp, and features herein shown but not described or claimed in detail may conform to the disclosure of said patent.

The object of the present invention is to provide an improved and novel arrangement of the air distributing pipes by means of which air under pressure is discharged into the tank containing the material to be agitated, whereby the tendency of solid particles held in suspension by the material to deposit by gravity and thus to clog said pipes in whole or in part, will be prevented.

In accordance with my invention, I attain the objects thereof by the combination in an agitator, of a rotatable shaft comprising separate sections, a coupling member which connects said sections, the upper section of said shaft and said shaft coupling being provided with a plurality of communicating passage-ways, a pipe adapted for connecting said passage-ways in said upper shaft section with a source of supply of air under pressure, means for controlling the admission of air from said air supply pipe to said passage-ways and air distributing pipes secured in the discharge ends of the passage-ways in said coupling member, the discharge ends of which, respectively, are secured to the agitator bar at different distances from the axis of the agitator shaft, said pipes extending at such angles to the horizontal, respectively, that slurry or other liquid or semi-liquid contained in the tank will drain from said pipes by gravity when the tank is emptied. In usual practice, the angle of said pipes to the horizontal will be upwards of forty-five degrees (45°), but admits of a wide range of variation.

Specifically, also, the means for securing the discharge ends of the air distributing pipes to the agitator bar consists of holes formed in said agitator bar in which the discharge ends of said air distributing pipes are secured, my improved agitator also comprising guide means for conveniently effecting engagement of the discharge ends of said distributing pipes with said holes in the agitator bar.

My invention also comprises the various other features, combinations of features and details of construction hereinafter described and claimed.

In the accompanying drawings in which my invention is fully illustrated—

Figure 1 is a side view partly in section of an agitator embodying my invention and improvements, shown as installed for use in a tank, shown in vertical, central section.

Figure 2 is an enlarged sectional view of the upper portion of the agitator on the line 2—2 of Fig. 1, the tank and parts of the agitator being omitted.

Figures 3, 4, 5 and 6 are enlarged sectional plan views on the lines 3—3, 4—4, 5—5 and 6—6, respectively, of Fig. 2; and Figure 7 is an enlarged fragmentary view, partly in elevation and partly in section, on the line 7—7 of Fig. 1.

For purposes of clear and definite illustration, I have, in the drawings, shown an agitator embodying my invention and improvements as installed for use in a tank designed and adapted for containing slurry to be used in the manufacture of cement.

Describing the invention with particular reference to the drawings, A designates a tank designed to contain slurry, which may be one of a series of tanks from which the slurry is drawn off in succession and delivered to the kilns, not shown.

Mounted within the tank A is an agitator embodying my invention and improvements, designated as a whole B, which comprises a shaft $b$ rotatably mounted in suitable bearings supported on I-beams 1, which extend across the tank A and the ends of which rest upon and are supported by the side walls thereof.

Secured to the lower end of the shaft $b$ is an agitator bar 2 consisting, as shown, of a channel bar disposed with its channeled side up. As shown, said agitator bar 2 is secured directly to a block 3, the lower face of which is shaped and proportioned to fit the channel of the agitator bar 2 and which comprises a boss 4 fitted to the lower end of the shaft $b$—which, as shown, is hollow—said boss being pinned or otherwise rigidly secured to said shaft. The agitator bar 2 may be riveted or bolted directly to the block 3. Said agitator bar extends substantially parallel with the bottom of the tank A at a short distance above the same and is preferably reinforced and strengthened by diagonal braces 5 which connect said agitator bar at opposite sides of its center with the shaft $b$. As shown, the lower ends of said braces are secured to lugs 6 on the agitator bar and their upper ends to lugs 7 formed on a collar 8 secured to the shaft $b$. As shown, said braces 5 consist of separate sections connected by turn buckles 9, thus providing for adjusting the position of said agitator bar when desired. In practice, said agitator bar is usually positioned two or three feet above the bottom of the tank, but this distance may be varied as desired.

The shaft $b$ is rotatably mounted in a bearing formed in a bearing block 10 which is supported on I-beams 11 connected to and which connect the I-beams 1.

As shown, the bearings for mounting said shaft $b$ are constructed and arranged to carry the weight of said shaft, the agitator bar 2 and parts associated therewith comprising a hub portion 12, pinned or otherwise rigidly secured to the upper end of the shaft $b$, provided with a shoulder 13 which rests upon the upper end of the bearing block 10 and carries the weight of the agitator shaft and parts supported thereon.

Preferably, also, the bearings for the shaft $b$ comprises a steady bearing adapted to prevent wabbling of the lower end of said shaft. As shown, said steady bearing consists of a bearing block 14 secured to the bottom of the tank A, provided with a journal bearing 15 fitted to which is a journal 16 formed on a journal block 17 secured to the underside of the agitator bar 2 with the axis of the journal in alignment with the axis of the shaft $b$.

The journal block 17 is bolted or otherwise rigidly secured to the block 3 secured to the lower end of the agitator shaft, the agitator bar 2 being clamped between said blocks 3 and 17 and being prevented from turning by means of the bolts which secure said blocks together and which extend through holes formed in said agitator bar.

Formed on the journal block 17 outside of the journal 16 and in spaced relation thereto, is a depending flange 18, which, when the bearing is assembled, is adapted to surround the portion of the block 14 in which the journal bearing 15 is formed, the relation being such that when slurry or other liquid or semi-liquid substance is admitted to the tank A and the level thereof rises above the lower edge of said depending flange or skirt, air will be trapped in the space within said depending flange or skirt, which will effectually prevent access of material contained in the tank to the journal bearing 15.

In operation, rotation is adapted to be imparted to the agitator shaft by suitable means consisting, as shown, of gears 19 and 20 secured to the upper end of the agitator shaft $b$ and to a driven shaft 21, respectively.

The shaft $b$ consists of separate upper and lower sections 22 and 23 which are rigidly connected in axial alignment by means of a coupling member 24, formed on which are aligned bosses 25 and 26 which are fitted into the proximate ends of the shaft sections 22 and 23, with shoulders 27 formed on said member resting in contact with the ends of said pipe sections. Said shaft sections are pinned or otherwise secured to said bosses 25 and 26.

In accordance with my present invention, air under pressure is adapted to be discharged into the tank A through pipes 28, 29, 30 and 31, the upper ends of which are secured in the discharge ends of air channels 28′, 29′, 30′ and 31′, formed in the shaft coupling member 24 and the discharge ends of which, respectively, are secured to the agitator bar 2 at different distances from the axis of the shaft $b$ and are directed downwardly. With the described construction, it is obvious that, as the agitator rotates, the discharge ends of said pipes will describe circles concentric with the axis of the shaft $b$, the relation preferably being such that the circles described by said pipes will be arranged substantially equal distances apart and will be disposed symmetrically over the cross sectional area of the tank.

For convenience in installing said air distributing pipes, they are preferably made in two sections connected directly to the coupling member 24 being relatively short and being bent so that their outer ends will extend substantially at the desired angles of the inclination to the horizontal of the main lower sections of said air distributing pipes, respectively. With the construction described, it is obvious that the lower sections of said pipes, which are most liable to become clogged or choked in operation may be quickly and conveniently removed and replaced.

As shown, the lower ends of said air distributing pipes extend through holes 33 formed in the web portion of the agitator bar 2, which will maintain them in position. Obviously, if it should become necessary to replace the removable section of an air distributing pipe while the tank A was full of slurry or other liquid or semi-liquid material, it would obscure the view of the agitator bar and other parts positioned below the surface thereof and would render it difficult in replacing one of said pipes, to locate the hole in the agitator bar into which it was to be inserted, which might and probably would involve considerable loss of time. To prevent this, my improved agitator preferably comprises guide means adapted to facilitate insertion of the discharge ends of the lower sections of the air distributing pipes into the holes 33 formed in the agitator bar.

As shown, said guides consist of bars 34, the lower ends of which are pivoted to the agitator bar adjacent to the holes 33 therein and formed on which are lugs or projections 35 provided with holes or openings which, when the agitator is assembled will align with the holes 33 in the agitator bar through which the air distributing shafts are inserted, respectively.

As shown, the lugs or projections 35 consist of U-bolts secured in holes formed in said guide bars, the loops of which form the holes which receive said air distributing pipes.

As shown, the means for pivotally connecting the lower ends of said guide bars 34 to the agitator bar 2 consist of pivot rods 36, opposite ends of which are secured in the flanges of the channel beam which forms said agitator bar, and sleeves 37 formed at the lower ends of said pivot rods. Also, the guide bars 34 are somewhat narrower than the distance between the channels of the agitator bar and are maintained in transverse adjustment on the pivot rods 36 corresponding to alignment of the holes in the projections 35 thereon with the holes 33 in the agitator bar by spacing sleeves 38 adjusted to said pivot bars between the end of the bearing sleeves 37 on said bars and a flange of the agitator bar 2.

For convenience in locating and manipulating the guide bars 34, cords or wires 39 preferably are attached to the upper end of said guide bars, said cords or wires extending above the top of the tank and being fastened to a suitable fixed support. With the construction described, the upper lug 35 on a guide bar 34 can conveniently be located by means of the cord or wire 39 attached thereto and a pipe section inserted therethrough, after which it can readily be inserted through the holes in the other guide lugs into engagement with the hole 33 corresponding to any guide bar.

Air under pressure is adapted to be delivered to the pipes 28, 29, 30 and 31 from a pipe 40 adapted to communicate with a source of supply of air under pressure, not shown, through passageways formed in the upper shaft section 22—formed, as shown, by pipes 41, 42, 43 and 44, the lower ends of which, respectively, communicate with the upper ends of the passageways 28' to 31' in the shaft coupling member 24—and passageways 41', 42', 43' and 44', formed in the hub 45 of the driving gear 19, into the lower ends of which the pipes 41 to 44 are connected, respectively.

As in the case of the agitator which forms the subject-matter of U. S. Letters Patent No. 1,633,708, heretofore referred to, the admission of air from the air supply pipe 40 to the air passageways 42' to 45' and thence to the air distributing pipes 28 to 31, is controlled by means of an air distributing valve designated as a whole c, constructed and arranged to admit air to said air distributing pipes, respectively, one at a time and during any desired interval—usually during one entire revolution of the agitator.

Also, my invention contemplates that the agitator shaft run continuously, thus overcoming the objection of hit or miss agitation by means of air pipes controlled by manually operated valves. However, in most cases it is unnecessary to supply air under pressure to the distributing pipes continuously during the operation of the agitator. Preferably, therefore, the agitator comprises means for controlling the air supply pipe 40, whereby said valve will be opened at and for predetermined intervals only, a desirable relation for mixing slurry being such that said control valve will be open during approximately 4 in each 20 revolutions of the agitator, or stated definitely, so that air will be admitted to each distributing pipe 28 to 31, respectively, during 1 in each 20 revolutions of the agitator.

Specifically the means for thus controlling the supply pipe 40 and the admission of air from said supply pipe to the air distributing pipes 28 to 31, forms no part of the invention of the present application and my invention contemplates the use of any desired or approved means for this purpose. However, I consider the air control means shown and fully described in my prior Patent No. 1,633,708, to be preferable for the purpose, and reference is here made to said patent for a full description in detail of such means.

I claim:

1. In an agitator of the type specified, the combination of a rotatable shaft, means for rotating said shaft, an agitator bar secured to said shaft, said shaft being provided with a plurality of separate passageways in its upper portion, a pipe adapted for connecting said passageways with a source of supply of air under pressure, means for controlling the admission of air to said passageways constructed and arranged for admitting air to said passageways separately during predetermined intervals, air distributing pipes which communicate with the air passageways in the upper portion of the agitator shaft, and means for connecting the discharge ends of said distributing pipes, respectively, to the agitator bar at different distances from the axis of the agitator shaft, said pipes extending downwardly at such angles that the material being agitated will drain therefrom by gravity.

2. An agitator as specified in claim 1, in which the discharge ends of the air distributing pipes are confined in holes formed in the agitator bar.

3. An agitator as specified in claim 1, in which the air distributing pipes consist of separate sections detachably secured together, comprising relatively short curved sections which communicate, respectively, directly with different passageways in the upper portion of the agitator shaft.

4. An agitator as specified in claim 1, in which the discharge ends of the air distributing pipes are confined in holes formed in the agitator bar, and which comprises guide means for effecting engagement of the discharge ends of said distributing pipes with said holes in the agitator bar.

5. An agitator as specified in claim 1, in which the discharge ends of the air distributing pipes are confined in holes formed in the agitator bar, and which comprises guide means for effecting engagement of the discharge ends of said distributing pipes with said holes in the agitator bar comprising members secured to the agitator bar, and projections thereon provided with eyes which align with said holes in the agitator bar in which the distributing pipes are confined respectively, when the agitator is assembled for use.

6. An agitator as specified in claim 1, in which the discharge ends of the air distributing pipes are confined in holes formed in the agitator bar, and which comprises guide means for effecting engagement of the discharge ends of said distributing pipes with said holes in the agitator bar, comprising members pivoted to the agitator bar, and projections thereon provided with eyes which align with said holes in the agitator bar in which the distributing pipes are confined, respectively, when the agitator is assembled for use.

7. An agitator as specified in claim 1, in which the discharge ends of the air distributing pipes are confined in holes formed in the agitator bar, and which comprises guide means for effecting engagement of the discharge ends of said distributing pipes with said holes in the agitator bar, comprising members pivoted to the agitator bar, and a plurality of projections on each of said guide members provided with eyes which align with said holes in the agitator bar in which the air distributing pipes are secured, respectively, when the agitator is assembled for use.

8. An agitator as specified in claim 1, in which the discharge ends of the air distributing pipes are confined in holes formed in the agitator bar, and which comprises guide means for effecting engagement of the discharge ends of said distributing pipes with said holes in the agitator bar, comprising members pivoted to the agitator bar, projections thereon provided with eyes which align with said holes in the agitator bar in which the distributing pipes are confined, respectively, when the agitator is assembled for use, and flexible members attached to said pivoted guide members, respectively, and to belaying means positioned above the level of the material to be agitated.

9. An agitator as specified in claim 1, in which the agitator bar consists of a channel bar secured to the agitator shaft with its channels disposed upwards, and the discharge ends of the air distributing pipes are confined in holes formed in the web portion of said channel, and which comprises guide means for effecting engagement of the discharge ends of said pipes, respectively, with different holes in said channel bar, comprising members pivoted to and between the flanges of said channel bar, projections on said members provided with eyes which align with said holes in the agitator bar in which said air distributing pipes are confined, respectively, when the agitator is assembled for use.

10. An agitator as specified in claim 1, in which the agitator bar consists of a channel bar secured to the agitator shaft with its channels disposed upwards, and the discharge ends of the air distributing pipes are confined in holes formed in the web portion of said channel, and which comprises guide means for effecting engagement of the discharge ends of said pipes, respectively, with different holes in said channel bar, comprising members pivoted to and between the flanges of said channel bar, projections on said members provided with eyes which align with said holes in the agitator bar in which said air distributing pipes are confined, respectively, when the agitator is assembled for use, the means for pivotally connecting said guide members to the flanges of said channel bar consisting of pivot rods the ends of which are secured to the flanges of said channel and bearings formed at the attached ends of said guide members which are adjusted thereto.

11. An agitator as specified in claim 1, in which the agitator bar consists of a channel bar secured to the agitator shaft with its channels disposed upwards, and the discharge ends of the air distributing pipes are confined in holes formed in the web portion of said channel, and which comprises guide means for effecting engagement of the discharge ends of said pipes, respectively, with different holes in said channel bar, comprising members pivoted to and between the flanges of said channel bar, projections on said members provided with eyes which align with said holes in the agitator bar in which said air distributing pipes are confined, respectively, when the agitator is assembled for use, the width of said guide members being less than the distance between the flanges of said channel bar, and the means for pivotally connecting said guide members to the flanges of the channel bar consisting of pivot rods the ends of which are secured in the flanges of said channel bar, bearings formed at the attached ends of said guide members which are adjusted thereto, and spacing sleeves adjusted over said pivot rods between the pivoted ends of said guide members and flanges of said channel bar adapted to maintain said guide members in positions corresponding to alignment of the guide eyes on said members with the holes formed in said channels in which, respectively, different air distributing pipes are confined.

12. An agitator as specified in claim 1, in which the agitator shaft comprises separate sections and a coupling member which connects said sections, the upper section of said shaft being hollow and the air passageways therein consisting of separate pipes supported within the same, and said pipe coupling being provided with passageways into which, respectively, the discharge end of a pipe supported within the hollow upper section of the agitator shaft and the admission end of an air distributing pipe are connected.

In witness that I claim the foregoing as my invention, I affix my signature this 27th day of June, 1927.

ROLAND E. MINOGUE.